United States Statutory Invention Registration [19]

[11] Reg. Number: H933

Buczek et al. [43] Published: Jul. 2, 1991

[54] INFRARED COHERENT OPTICAL SENSOR

[75] Inventors: Carl J. Buczek, Encinitas; Vito F. Pizzurro, Villa Park, both of Calif.

[73] Assignee: The United States of America as represented by the Secretary of the Air Force, Washington, D.C.

[21] Appl. No.: 3,168

[22] Filed: Jan. 14, 1987

[51] Int. Cl.[5] ..... G01C 3/08; G01B 9/02

[52] U.S. Cl. ..... 356/5; 356/349; 250/338.1

[56] References Cited

U.S. PATENT DOCUMENTS

| | | | |
|---|---|---|---|
| 3,258,597 | 6/1966 | Forrester | 250/199 |
| 3,302,027 | 1/1967 | Fried et al. | 250/199 |
| 3,409,369 | 11/1968 | Bickel | 88/1 |
| 3,573,463 | 4/1971 | Goodwin et al. | 250/199 |
| 4,195,221 | 3/1980 | Moran | 455/609 |
| 4,391,515 | 7/1983 | Forrester et al. | 356/5 |

OTHER PUBLICATIONS

C. J. Buczek et al., "Laser Injection Locking", Proc. IEEE, vol. 61, pp. 1411-1431, Oct. 1973.

*Primary Examiner*—Stephen C. Buczinski
*Assistant Examiner*—Linda J. Wallace
*Attorney, Agent, or Firm*—Bernard E. Franz; Donald J. Singer

[57] ABSTRACT

A dual-beam amplitude-modulated laser transmitter/-receiver suitable for laser-radar applications is scalable to high powers because there is no active modulator element that the laser beam passes through. The transceiver comprises a laser source with two separate independent laser optical cavities. Each laser cavity is similar, but each operates at its own frequency. Signals from the two cavities are superimposed at a combining beam splitter to form two transmitter output beams with each combined beam intensity modulated at the laser difference frequency. The output consists of two beams separated in elevation and with equal beam powers from each laser cavity the intensity modulation is 100%. Each beam has its own homodyne detector and separate local oscillator. Thus, each beam path is considered to be a distinct homodyne transceiver. If the frequency of one of the laser sources is changed in time, an AM/FM/CW output suitable for absolute range measurements and fine doppler is generated. The laser transmitter does not require internal or external modulators such as acousto-optic or electro-optic cells. Thus, it is not limited by the modulator characteristics.

6 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INJECTION-LOCKING SCHEMATIC

FC SENSOR SCANNING BY MODE

FC SENSOR SYSTEM BLOCK DIAGRAM

FC SENSOR FUNCTIONAL BLOCK DIAGRAM

INFRARED COHERENT OPTICAL SENSOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to an infrared coherent optical sensor and more particularly to a laser transceiver with modulation suitable for laser-radar applications, including use as a multifunction sensor.

Pulsed lasers and modulated lasers using various internal and external modulators are known in the art for various applications, including laser radar.

U.S. patents of interest include U.S. Pat. No. 3,573,463 to Goodwin et al., which discloses a communications system comprising a pair of laser transceivers. Each transceiver includes two laser beams of different frequencies, one of which is modulated according to an information signal. The two beams are mixed by means of a beam splitter which may be disposed either inside or outside the laser cavity. U.S. Pat. No. 3,409,369 to Bickel discloses a laser radar doppler shift system using two transmitted frequencies. Since the two frequencies are slightly different, the beat frequencies go in and out of phase, causing an amplitude modulation whose frequency is proportional to the difference in the two beat signals and the velocity of the target. U.S. Pat. No. 3,258,597 to Forrester shows a laser communication system having separate spectral line sources 10 and 11. Fried et al in U.S. Pat. No. 3,302,027 describe an interferometric arrangement for modulating light. U.S. Pat. No. 4,195,221 to Moran is directed to an optical heterodyne scanning system in which two coherent light signals are mixed to produce a different signal and Forrester et al in U.S. Pat. No. 4,391,515 show an optical transceiver with shared common optics.

SUMMARY OF THE INVENTION

An object of the invention is to provide a simple, efficient, amplitude-modulated laser transceiver suitable for laser-radar applications, that is scalable to high powers.

The invention is directed to a dual-beam amplitude-modulated laser transmitter/receiver suitable for laser-radar applications that is scalable to high powers because there is no active modulator element that the laser beam passes through. The transceiver comprises a laser source with two separate independent laser optical cavities. Each laser cavity is similar, but each operates at its own frequency. Signals from the two cavities are superimposed at a combining beam splitter to form two transmitter output beams with each combined beam intensity modulated at the laser difference frequency. The output consists of two beams separated in elevation and with equal beam powers from each laser cavity the intensity modulation is 100%. Each beam has its own homodyne detector and separate local oscillator. Thus, there considered to be a distinct homodyne transceiver associated with each beam path. If the frequency of one of the laser sources is changed in time, an AM/FM/CW output suitable for absolute range measurements and fine doppler is generated.

A feature is that the laser transmitter does not require internal or external modulators such as acousto-optic or electro-optic cells. Thus, it is not limited by the modulator characteristics.

Advantages of the invention are that it is much more efficient than the prior art devices because it does not require a modulator with its driver, it is easy to change modulation frequency or to have it vary with time because this is done electronically at low power levels, and it is scalable to high powers because there is no active modulator element that the laser beam passes through.

DETAILED DESCRIPTION

Outline 1.0 Lossless Envelope Modulation
1.1 Lossless Envelope Modulation Transmitter
1.11 Optical Characteristics
1.12 Electrical Characteristics
1.2 Lossless Envelope Modulation Basic Receiver Processing
1.21 Optical Characteristics
1.22 Electrical Characteristics
1.23 System Application
2.0 MICOS Introduction
2.1 Dual Beam MICOS
3-D Mode
MTI Mode
WD Mode
2.2 Injection-Locking Frequency Control
2.3 Discussion and Conclusion
3.0 MICOS System Description
FC Sensor
3.1 FC SENSOR OPERATION

1.0 LOSSLESS ENVELOPE MODULATION

The system comprises a transmitter and a receiver, which as shown later are combined as a transceiver.

1.1 LOSSLESS ENVELOPE MODULATION TRANSMITTER

In lossless envelope modulation, two similar laser source beams differing in frequency are optically combined to form two output beams. The envelope and Power of each output beam is modulated at the frequency difference between the two source beams. Since all the laser power appears as 100% modulated output, this method achieves the maximum possible efficiency.

1.11 Optical Characteristics

Figure 1:
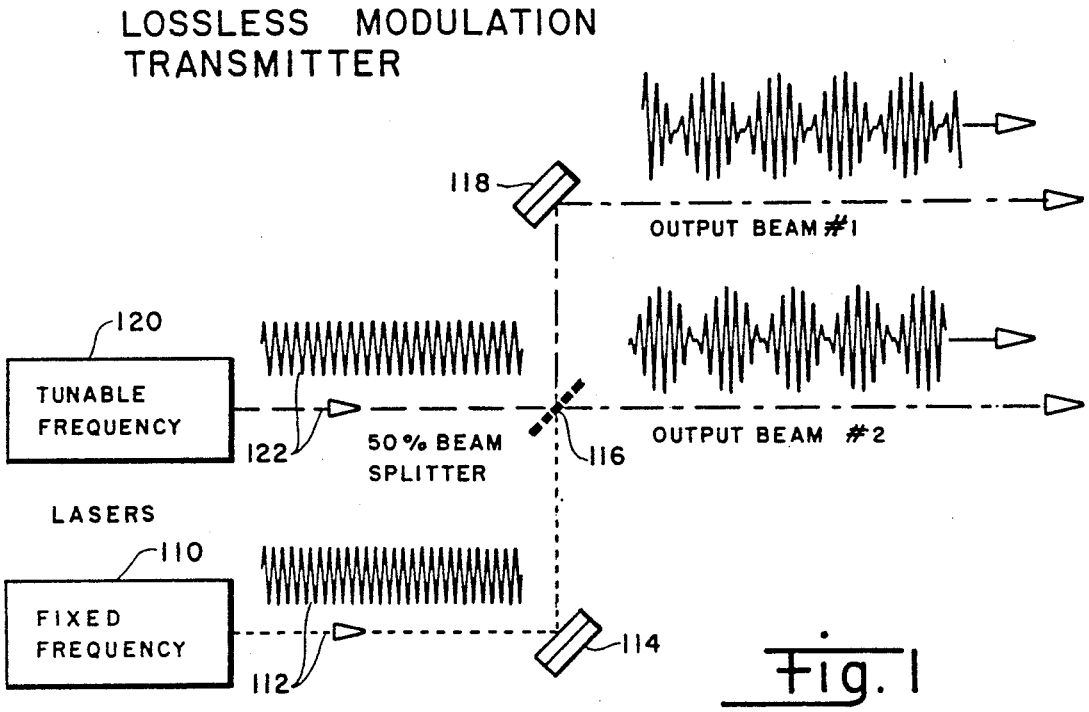
FIG. 1 is a symbolic diagram of a lossless modulation transmitter.

Lossless envelope modulation is illustrated in FIG. 1. This shows two similar laser beams combined at a beam splitter. The essential optical characteristics of this figure are:

(a) The laser beam 112 from the "fixed-frequency" source 110, shown dotted, is turned by a mirror 114 to the 50% beam splitter 116.

(b) One-half of the power of this laser beam 112 passes upward through the beam splitter 116 and one-half of the power is reflected to the right.

(c) The portion of the beam that passes upward is reflected to the right by a turning mirror 118.

(d) In similar fashion, the laser beam 122 from the "tunable-frequency" source 120, shown dashed, transmits through and reflects from the beam splitter 116.

(e) The tunable-frequency dashed beam is thus split and superimposed on the fixed-frequency dotted beam.

There are two output beams, #1 and #2. Each of these contains one-half of the power from the individual laser sources.

1.12 Electrical Characteristics

The essential electrical characteristics of this coherent optical combining are also illustrated in the figure:

(1) The tunable-frequency and the fixed-frequency laser beams are shown as sine waves.

(2) In this illustration, the dashed-beam sine wave 122 is shown as a lower frequency than the dotted-beam sine wave 112.

(3) The output beams #1 and #2 contain both sine waves equally.

(4) Each output beam is a 100% envelope-modulated sine wave.

(5) The frequency of the envelope modulation is the frequency difference between the two source beams.

(6) The high-frequency carrier in the modulated output beams is the average of the two laser source frequencies.

Thus, in lossless envelope modulation, the laser transmitter generates two output beams. Each beam is offset in angle from the other at the output aperture to form two scan beams.

1.2 LOSSLESS ENVELOPE MODULATION BASIC RECEIVER PROCESSING

The laser receiver detects and uses the envelope modulation. The laser difference frequency and resulting envelope modulation are electronically controlled to satisfy the various sensing functions. For example, a fixed-difference frequency near 10 Mhz would be used for high-resolution 3-D. A swept or changing frequency difference would be used for the measurement of absolute range.

The receiver has two detection channels. Each channel is angularly aligned to receive scattered laser energy from its respective transmitter beam. In the transmitter, two laser sources differing in frequency were combined spatially to synthesize the envelope-modulated beams.

The receiver essentially regenerates electrically the original transmitted signal format. For 3-D measurements, the frequency of the envelope modulation is fixed and the electrical signals are used to determine the received envelope phase for comparison with the transmitter phase. For range measurements, the frequency of the envelope modulation is changing and the received envelope frequency is measured and compared with that from the transmitter.

1.21 Optical Characteristics

Figure 2:
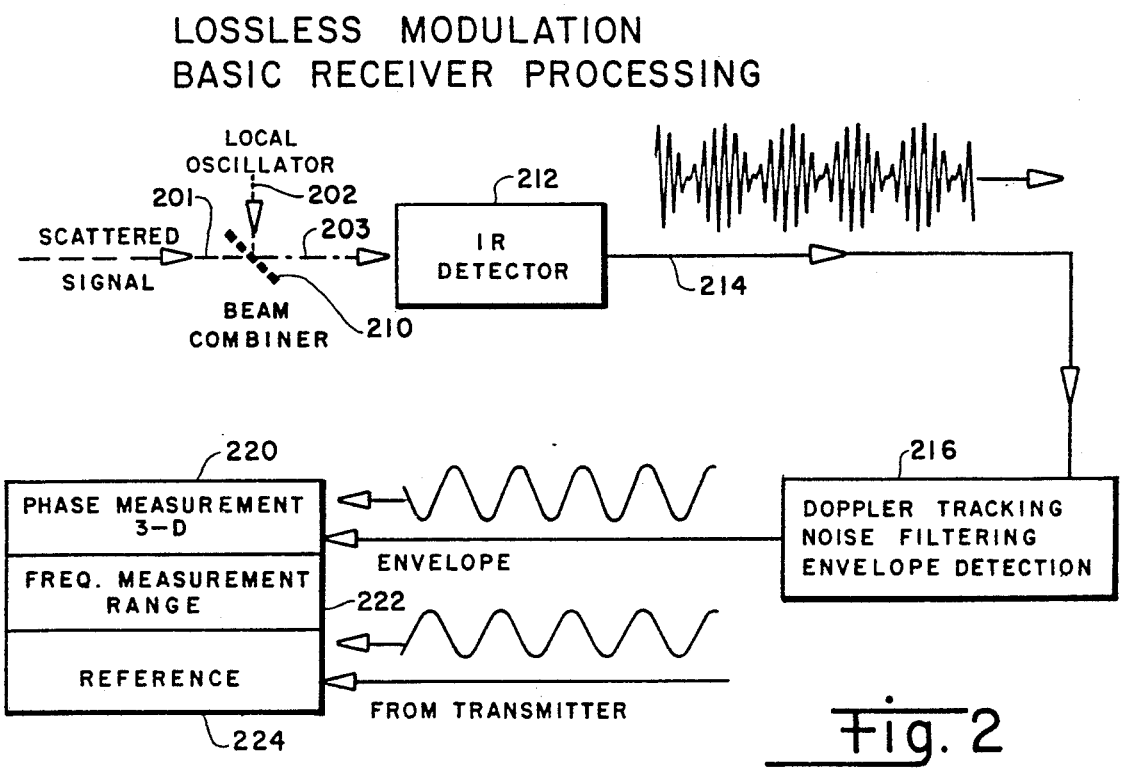
FIG. 2 is a symbolic diagram showing lossless modulation basic receiver processing.

The basic receiver processing elements are illustrated in FIG. 2, which shows one of the receiving channels. The received scattered signal 201 is spatially combined in a beam combiner 210 with a portion of the fixed-frequency laser transmitter source as a local oscillator signal 202. The received signal 201 and local oscillator signal 202 thus form a beam that is intensity modulated at the frequency differences between the signal and the local oscillator. This frequency difference which is a consequence of the doppler shift serves as the carrier for the signal envelope modulation. A detector 212 converts the intensity modulation to current and, as shown in the figure, the signal envelope modulation is on the detector current on line 214.

1.22 Electrical Characteristics

The electric input to the receiver is an envelope-modulated signal similar to the output of the transmitter. However, the carrier illustrated in the receiver figure is about $5\times10^7$ Hz for operation near Mach-1. The transmitter optical carrier illustrated in FIG. 1 is $3\times10^{13}$ Hz for 10 micrometer $CO_2$ lasers.

The receiver doppler unit 216 tracks the detector signal to utilize narrowband noise filtering in order to achieve high sensitivity. The signal envelope is then detected and measurements of the phase and frequency on this envelope as shown by blocks 220 and 222 are made and compared with a reference 224 from the transmitter.

1.23 System Application

Since the receiver can be configured to utilize the frequency of the transmitted envelope in its fixed processing circuitry, the receiver is inherently adaptable to fixed-frequency and variable-frequency envelope modulation. Thus, changes in modulation format can be used to enhance the system utility. For example, scan lines for absolute range measurement can be interleaved with scan lines for 3-D relative range measurement during one frame.

2.0 INTRODUCTION

The system makes use of a multifunction sensor in the form of a $CO_2$ laser radar sensor for detecting, classifying and attacking moving ground targets from a low-flying high-performance aircraft.

Advances in the state-of-the-art Hg:Cd:Te photodiodes, production of homogeneous optical material and laser frequency control were developed to produce the sensor. Perhaps the most noteworthy of the advances is the essentially lossless technique for producing amplitude modulation of the transmitted laser beams. In addition to a description of these developments, the report describes design details of the sensor, by major subassembly, and shows the results of tests performed to evaluate performance. A Terrain Clearance capability is provided by a second $CO_2$ laser radar sensor.

Hardware was designed and developed to provide attack and fighter aircraft with the following capabilities:

Terrain clearance control for low level flight.

Autonomous target attack by performing the following functions:

Detection of moving targets.

Automatic target classification.

Guiding ripple fired hyper-velocity missiles.

2.1 DUAL BEAM TRANSCEIVER

Figures 3, 3A:
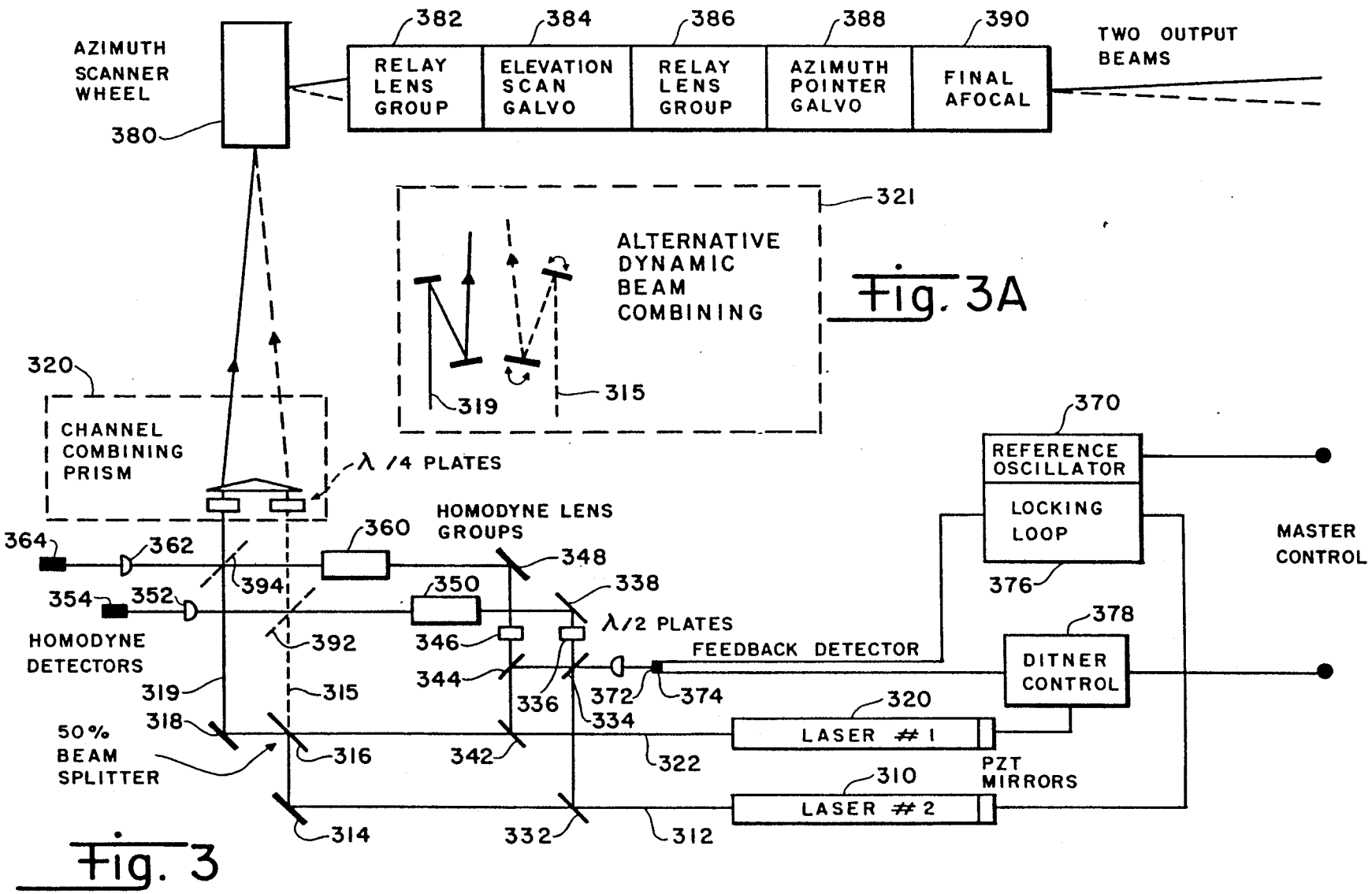
FIG. 3 is a schematic and block diagram of a dual-beam Multifunction Infrared Coherent Optical Sensor (MICOS)
FIG. 3A is a symbolic diagram of an alternative showing dynamic beam combining.

The basic dual-beam transceiver is shown schematically in FIG. 3. The output consists of two beams separated in elevation. Although each beam has its own path through the optical train, the beams share the scan elements and optics. Each beam has its own homodyne detector and separate laser local oscillator. Thus, there can be considered to be a distinct homodyne transceiver associated with each beam path.

During operation, the beams are scanned together and each beam scans a separate line. The angular spacing between the beams, and their resulting line spacing is determined by an element such as the prism unit 320 shown. This line spacing can be: (1) fixed as a compromise that satisfies the MTI, 3-D and WD modes (2) changed for each mode, or (3) under dynamic galvo control. This latter possibility is shown schematically in FIG. 3A, using a dynamic beam combining unit 321 in place of the prism unit 320.

From the prism unit 320, the two output beams pass through an azimuth scanner wheel 380, a relay lens group 382, an elevation scan galvonometer 384, another relay lens group 386, an azimuth pointer galvonometer 388, and a final afocal lens group 390.

For the MTI search mode or the 3-D target identification mode, a given field must be scanned in a given time. The signal to noise at the receiver IF is proportional to the power on the target and inversely proportional to the bandwidth. When the dual-transceiver design is compared with a single-transceiver design the power on target for each channel is halved but the bandwidth is also halved because of the reduced dwell time on each pixel. Thus, the basic performance for the dual-beam transceiver is the same as for a single-beam transceiver. The longer dwell time with the dual design can be used to improve the doppler or MTI resolution.

The transmitter source consists of a laser design with two separate independent laser optical cavities 310 and 320. Each laser cavity is similar but each operates at its own frequency. A small sample of the beam from each laser cavity is used as the local oscillator beam in this homodyne configuration. This beam is rotated to orthogonal polarization by a $\lambda/2$ plate, optically shaped by the homodyne lens group to form a source that uniformly illuminates the detector plane after passing through the polarizing beam splitter and the detector lens to the detector.

From laser cavity 310, the beam 312 reflected by a polarizing beam splitter 332, passes through beam splitter 334, the $\lambda/2$ plate 336, reflected by a mirror 338, thence through the homodyne lens group 350, and a detecter lens 352 to a homodyne detector, 354. From laser cavity 320, the beam 322 reflected by a polarizing beam splitter 342, passes through beam splitters 344, the $\lambda/2$ plate 346, reflected by a mirror 348, thence through the homodyne lens group 360, and a detecter lens 362 to a homodyne detector, 364.

3-D Mode

For 3-D amplitude modulation, the outputs from the two cavities 310 and 320 are accurately superimposed at the combining beam splitter 316 to form two beams 315 and 319 for transmitter output. Each combined beam is intensity modulated at the laser difference frequency. With equal beam powers from each laser cavity, the intensity modulation is about 100%. Since the two modulated output beams do not overlap in the target region, operation does not depend on the phasing between the two arms of the combining 50 beam splitter. Therefore, since only the angular alignment of the interferometer must be held accurately, this technique places no new demands on the usual optical design.

The two laser cavity frequencies are shown controlled at the desired offset frequency by means of an electronic feedback loop. A small sample of one of the superimposed output beams illuminates the feedback control detector 372. The detected laser frequency difference is compared with the frequency of a reference oscillator 370 in the phase detector 374, the error signal is used in unit 376 to lock the frequency of laser #2 (310) to laser #1 (320). Laser #1 is controlled by means of a low-duty intermittent dither loop using a dither control unit 378 in a hill-climbing servo configuration, to maintain its frequency near its maximum power output point. Since the modulation rates are so much different, the same detector 374 can be used for both loops.

The 3-D measurement accuracy depends critically on knowing or stabilizing the modulation frequency, i.e., the laser frequency difference. The influence of the stability of this difference frequency on delta-range accuracy can be determined by first considering the laser phase difference $\Delta\phi$. The allowable laser frequency shift $\Delta f$ to achieve a given delta-range measurement accuracy of $\Delta R$ when the modulation frequency is $f_m$ is given by $$\Delta f \leqq (\Delta\phi/2\pi)\Delta t \quad (1)$$

This can be written as $$\Delta f \leqq f_m \Delta R/R \quad (2)$$

where R is the range. A 20 MHz difference frequency (or a modulation wavelength of 15 m) a maximum range of 5 km and an R of 0.3 m gives $f \leqq 1.2$ kHz. This short-term stability is achievable from a single laser; however, extremely careful designs in the areas of stable cavities, stable discharges, PZT mount design and control-loop electronics are required to achieve this frequency tracking control over the full time that a target is being measured (times of greater than 100 ms at short ranges).

As described later, laser injection locking in conjunction with laser frequency tracking can produce this required laser tracking stability and decrease the design burden in this area.

MTI Mode

During the MTI tracking mode, no intensity modulation is required. This operation corresponds schematically to removal of the 50% beam splitter 316 in the combining interferometer. Each laser can now operate independently at any frequency and the system will perform in this mode. However, the control of the two laser frequencies at the offset desired for 3-D is not deleterious to this mode. Thus, the apparent preferred operation is to have the lasers controlled and tracking for the 3-D mode during the MTI search. The lasers are now always ready and 3-D can be initiated any time the combining beam splitter is in place.

WD Mode

During weapon delivery a number of possibilities can be implemented depending on the guidance scheme. The targets will be tracked using MTI during this mode. Since only one beam is required to perform MTI during WD, the other beam can be coded or modulated as required. For example, beam polarization can be used to code positions within a targeting frame. In this case, the scan can always start from the bottom with the uncoded target line scan occurring first followed by the missile line. Thus when a missile gets a signal it merely uses the first circular-polarized beam as an initiating signal and then uses the information from the following missile line scan to determine its position. The order of events could, of course, be changed with different logic at the missile. Since the two beams are offset in angle there is no confusion which is the target beam and which is the missile beam. For this example, the laser frequencies can certainly remain locked at their 3-D separation.

As another example, amplitude modulation can be used to code the beam position. In this case, a Pockels cell similar to that used for polarization modulation can also be inserted in the missile beam and the sequence is similar to that described above. Alternatively, the laser outputs can be superimposed as in 3-D and offset in frequency using the locking loop to tune the modulation between, for example, 1 MHz and 2 MHz. These low frequency differences accommodate the missile detector response. However, as described before, the basic laser stability and the ability to control frequency limits the utility of this method. A dynamic injection-locking loop would be more difficult to implement in this range of frequencies.

The WD mode can use a beam that is separate and distinct from the MTI target-tracking beam. During the initial missile launch period when wide angles must be scanned at high rates, this separate beam approach can give additional system design flexibility.

2.2 INJECTION-LOCKING FREQUENCY CONTROL

The mixing of the outputs from a two-cavity laser can be used to efficiently generate the laser amplitude modulation required in 3-D measurements. With this method, high power intracavity electro-optic modulators which still must be proved are not necessary or the inherently less efficient external modulators are not required. The modulation is instead accomplished by means of passive optics and frequency control of lasers. The frequency control is accomplished with electronic techniques which are quite common now.

Figure 4:
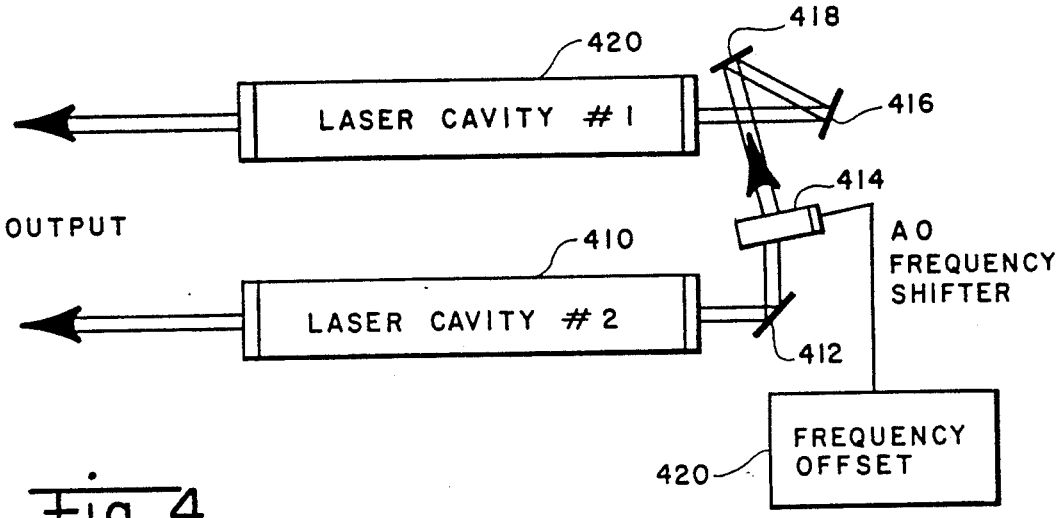
FIG. 4 is a block diagram showing injection locking.

However, as described previously, the control of the frequency offset that is required during a 3-D measurement time is difficult with only electronic, mechanical and electromechanical design. The locking of two $CO_2$ laser frequencies together using injection-locking techniques has been studied extensively and is suitable for satisfying the 3-D requirements. The optical schematic showing injection-locking frequency control is shown in FIG. 4. A small amount of laser power from the power stabilized laser 410, shown exiting from a low transmissivity back mirror 412, is shifted by the modulation frequency required with a GE acousto-optic cell 414. Then, this frequency shifted power is injected into the other laser cavity 420. This injected signal, which is within the frequency locking range of the second laser, controls the frequency of the second laser. The two outputs are now offset in frequency by the frequency drive in the AO cell 414 and the required difference frequency stability which depends on the drive to the AO cell is now readily achieved.

The original setting of the two cavities for the injected power to be within the injection-locking region is accomplished with the electronic control loop. Thus, initially the two laser frequencies are set very close to their separation electronically then the injection process stabilizes them to the degree required. If a new laser modulation frequency is required, the electronic loop is tuned to select this offset. In addition, the AO modulated beam is mechanically rotated to a new angular position to line up with the entrance angle to the laser. This can be accomplished automatically, as the frequency difference is tuned by means of a mechanical-tracking mount which also rotates the crystal to maximize the Bragg effect.

The design characteristics of the injection-locking technique can be evaluated by determining the injected laser power required to make the injection-locking region greater than the laser frequency associated with the electronic control loop.

The frequency locking region for the cavity illustrated in FIG. 4 can be written as (see C. J. Buczek, R. J. Freibert and M. L. Skolnick, "Laser Injection Locking", Proc. IEEE, vol 61 pp. 1411–1431 Oct. 1973.)

$$f=(Fc/2L)2(P_o/P_{osc})^{\frac{1}{2}}(TT_{osc})^{\frac{1}{2}} \quad (3)$$

Here (c/2L) is the cavity axial-mode spacing. $(P_o/P_{osc})$ is the ratio of the injected power to the self oscillating power. T is the transmission of the injection port and $T_{osc}$ is the overall transmission of the oscillator. For the waveguide laser design under consideration, the following are reasonably characteristic values.

$$c/2L=150 \text{ MHz}$$

$$(TT_{osc})^{\frac{1}{2}}=(0.005\times 0.2)^{\frac{1}{2}}=0.03.$$

Thus, the power ratio $(P_o/P_{osc})$ required to achieve a $\Delta f$ of 20 kHz, which can be reasonably obtained from the electronic control, is approximately $5\times 10^{-6}$. For a 20 w output laser, this means that 100 $\mu$w of injected power is required to establish a 20 kHz locking region. This power is very small and easily obtained. Another approach is to consider what is the size of the injection-locking region for the following reasonable laser design parameters. The laser power before frequency shifting in the AO cell is 0.5 w, the low-drive AO cell is 5% efficient, the oscillator power is 20 w, the back mirror transmission is 0.005 and the output mirror transmission is 0.2. For the same c/2L as used previously, this gives us an injection-locking region $\Delta f=300$ kHz. This is well in excess of the requirements. Thus, the parameters required to achieve precise injection control are rather easily achieved and this powerful laser technique can be utilized to greatly simplify the design of the 3-D laser source. The laser injection-locking requirements are sufficiently modest that wide optical flexibility exists in implementing this technique. In fact the injection power requirements are low enough that a small, low-drive power, in-line electro-optic modulator should be considered for the frequency shifter. This element does not have to be tuned angularly in position as frequency is changed. The EO frequency shifter would certainly be more suitable than the AO cell for use in the agile lower frequency WD scan discussed previously.

2.3 DISCUSSION AND CONCLUSION

The dual-beam MICOS approach does satisfy the system requirements with cw lasers in a configuration where almost all the laser power is utilized effectively. No higher power lossy AO or EO modulators are required. Laser injection-locking, a powerful technique in $CO_2$ lasers, is used to stabilize the modulation frequency.

The dual-beam MICOS does require additional receiver detectors and apparently more receiver processing. However, there is an inherent flexibility in this geometry which compensates for this. Moreover, these additions which increase the effective usage of transmitter power are in the low weight, low drain Portions of the equipment.

3.0 MICOS SYSTEM DESCRIPTION

In a system designated MICOS-1, major system functions of Automatic Target Acquisition/Enhanced Classification Potential/Weapon Delivery (ATA-/ECP/WD) grouped as fire control are performed by an FC sensor,and the Terrain Clearance function is provided by a TC sensor.

Both MICOS-1 Sensors employ coherent detection to obtain maximum sensitivity and in the case of the FC Sensor to provide a Moving Target Indication (MTI) discriminant. Usually,the FC Sensor is described as operating in the homodyne form of coherent detection; however, as described in the MICOS report, Vol. II, it also operates in the heterodyne form. The TC Sensor operates only in the heterodyne form of coherent detection. In an operational configuration, both sensors are envisioned installed in a pod that is attached to a high-performance aircraft and interfaced with the host aircraft avionics to provide autonomous operation. The FC sensor includes an embodiment of the Lossless Envelope Modulation using a dual beam laser.

FC Sensor

With the host aircraft flying at an altitude of 60 meters above ground level (AGL), at speeds up to 0.9 mach., the FC Sensor will perform the ATA, ECP, and WD functions in time sequence. In the ATA mode, an elevation pointing mirror in the sensor is driven by a galvonometer to sinusoidally scan 52.4 milliradians (3°) P-P in object space at a frequency of 300 Hertz. A raster 698 mrad (40°) wide is generated by sweeping the 103 mrad (5.9°)×103 mrad narrow field-of-view (NFOV) by means of a mirror external to the sensor. This mirror also is controlled by servos (part of the pod electronics) to provide sightline stabilization for the Sensor. Actually two laser beams, having a fixed angular separation in each mode, are scanned. One beam is co-aligned with the optical axis of the sensor; and the other beam is to the right (in azimuth) and above (in elevation) the on-axis beam (viewing the beams in the far field from the sensor). In the ATA mode, the angular separation in azimuth (0.58 mrad) and the azimuth sweep rate are set to assure that at least one beam will intercept a 3.4-meter long target at a range of 4.5 km.

Figure 5:
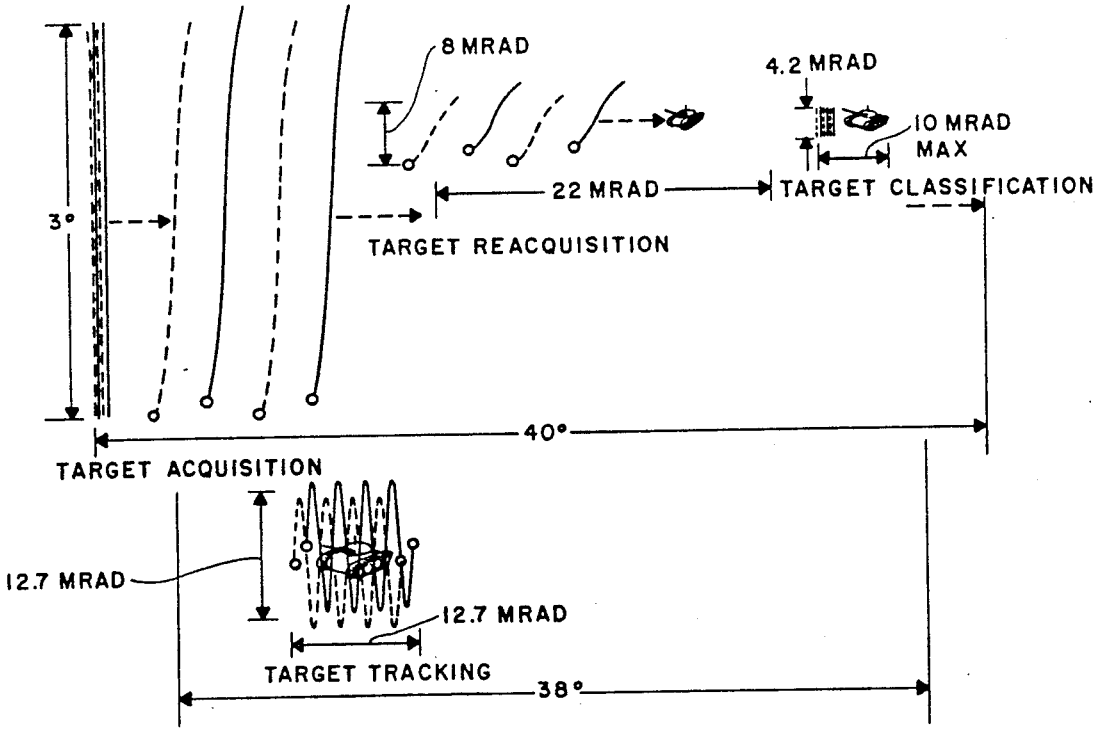
FIG. 5 is a diagram with graphs showing FC sensor scanning by mode.

Only the half cycle of the scan from the bottom to the top (closest range to the longest range) is used, as shown in FIG. 5. (Note: For the purpose of better illustrating the sensor operating modes, the relative size of the rasters and targets is not correct. The target (tank) in the expanded ATA raster should subtend more than two scans in azimuth.) Since the pod was not included under the MICOS-1 project, the azimuth component of the ATA raster is swept by the azimuth pointing mirror in the sensor, thus the dimensions of the raster are 52.4 mrad P-P in elevation by 103 mrad in azimuth. Six hundred cycles, scanned to generate the 698 mrad wide raster, produce 1200 cycles (and active scans) in object space, whereas 88.5 cycles are scanned to generate the 103 mrad wide raster to produce 177 cycles and active scans.

Detection of an MTI cue when either beam, or both beams, intercept a moving target, while scanning the ATA raster, causes the target coordinates to be stored in a target file. In a tactical system, the coordinates would be in inertial space. The position of the galvanometer that drives the lag angle compensator (corrects for the angle through which the beam is scanned during the round trip time, at the speed of light, to the target) also is read when the MTI cue is detected. This angle, and the scan rate, are used to calculate coarse range to the target, which also is stored in the target track file with the target coordinates. Up to 19 or 20 target files can be created in the operational system configuration.

After the ATA raster has been scanned, the sensor sequences to the ECP mode and the line-of-sight (LOS) of the sensor is commanded to the coordinates of the target in the first target file. Because the target was moving when detected, it is not likely to be exactly at these coordinates when the ECP mode is initiated, so an Automatic Target Reacquisition (ATR) raster is scanned to relocate the target. This raster is biased to start 22 mrad to the left of the target azimuth position in the target file as shown in FIG. 5. (No offset in elevation is needed because only minor variations in this angle will be evident to a low flying aircraft.) It (raster) is 8 mrad P-P in elevation, scanned at 300 Hz sinusoidally with the same beam spacing and azimuth sweep rate as the ATA raster. When a MTI cue from the target is received, scanning of the ATR raster is terminated, the new target coordinates are stored and the sensor is readied to scan an ECP raster. If an MTI cue has not been received by the time the ATR rater is 44 mrad wide, scanning is terminated, the target is dropped from the file and the LOS is commanded as described above to the coordinates of the target in the second target file.

After scanning of the ATR raster is terminated upon receipt of an MTI cue, the angular separation between the beams in azimuth is reduced to 0.1 mrad; i.e. essentially contiguous, for scanning the ECP raster. (To prevent crosstalk between the signals produced by both beams, the off-axis beam is 0.2 mrad above the on-axis beam in the NFOV and 0.62 mrad in the WFOV.) Another pair of galvonometer rotated mirrors (scanners), in the same coordinate system as the pointer mirrors, are driven to produce the ECP raster. The elevation scanner is driven with a 300 Hz triangular waveform to provide a 4.2 mrad P-P raster in object space. The AZ pointer and AZ scanner are commanded so that the ECP raster is started two mrad to the left of the target azimuth position determined when the MTI cue was detected in the ATR raster. This precaution is taken to assure that the ECP encloses the left edge of the target. The EL pointer is held at the angle read out when the MTI cue was detected in the ATR raster. Coordinates of the target leading edge and trailing edge plus relative range to the target; i.e., surface features, are provided to a target classifier as this raster is scanned. Logic in the sensor terminates the ECP raster when two scans (from the bottom to the top of the raster, as in ATA and ATR) are completed following the last MTI cue. If this condition is not met, the raster is terminated when it is 10.6 mrad wide.

When the ECP raster is terminated, the sensor parameters for scanning an ATR raster are restored, the target in the second target file is addressed and the above sequence is repeated. In a tactical configuration, each target detected during ATA would be classified in sequence until up to six high priority targets have been identified.

Following completion of the ECP sequence, the sensor is configured for tracking the selected targets (six maximum); i.e. the Automatic Target Tracking (ATT) mode. This is accomplished by inserting the WFOV lens group in the optical path of the Afocal Telescope and bringing the WFOV segmenting prisms together in front (object side) of the objective. These prisms bisect the objective vertically; i.e., the vertical dimension of the 373.5 mrad (21.4°)×373.5 mrad WFOV is split. The prism angle and orientation cause the WFOV to be reformatted so that the sensor views +57.6 mrad (±3.3°) EL×663.2 mrad (38°) AZ.

Target tracking rasters, generated by the scanners, can be centered on targets anywhere in the WFOV by applying appropriate commands to the galvanometer servos for the pointer mirrors. That is; the WFOV Pupil (3.329 cm dia.) can be positioned anywhere on the 12.7 cm objective under control of the pointers, and thereby to a corresponding position on a prism for directing the line-of-sight (LOS) as desired. Target tracking rasters 12.7 mrad square are scanned sinusoidally in elevation at 960 Hz with contiguous beam separation, while target data are acquired in each direction of scan. They are scanned at a rate of 48 per second with 16.667 ms of each interval expended to scan the raster (16 cycles) and 4.1667 ms used to command the pointers to the next target. Thus six targets can be tracked with position updates eight times per second.

Target tracking is initiated immediately following insertion of the WFOV lens group and the segmenting prisms. The AZ and EL pointers are commanded to the expected coordinates of each target in sequence. These coordinates are extrapolated from the apparent velocity in the azimuth axis, computed from the target position determined in the ATA mode and in the ECP mode. The target position error found by scanning the first ATT raster is used to update the target position before closing the target tracking loop. This is done to avoid the potential application of a large transient to the loop at the start of tracking. The target tracking loop then is closed after the second raster has been scanned.

A precision clock controls the timing of the ATT rasters and synchronizes the scanners so that the scan or elevation waveform, always starts at the same position (spatially) at the beginning of each raster. This feature is required for compatibility with a missile terminal guidance concept based upon logic in a missile receiver that determines position in the raster from timing of the raster scans detected by the receiver. A lower power coarse raster for missile capture also is a requirement of the above concept.

3.1 FC SENSOR OPERATION

Figure 6:
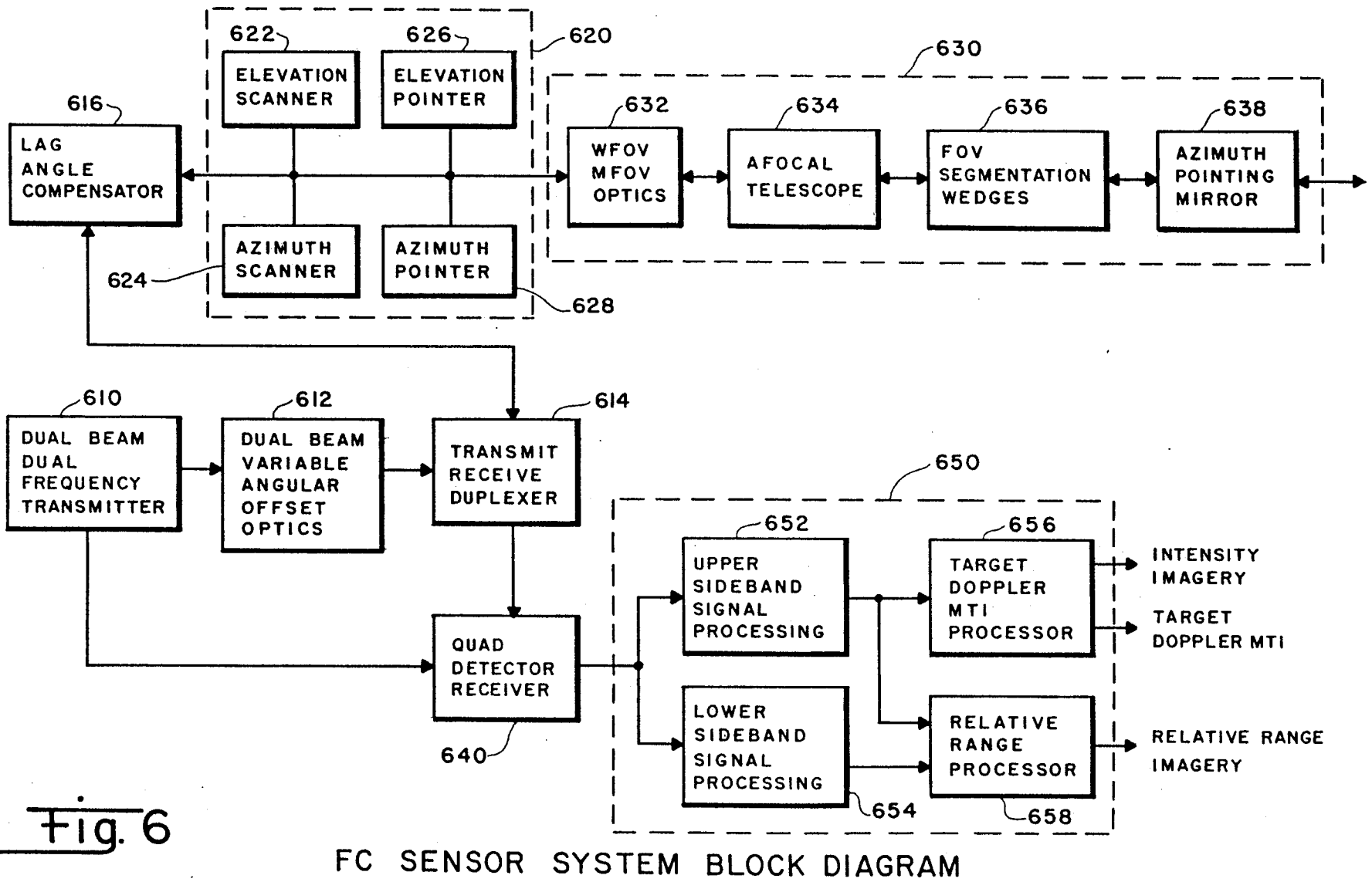
FIG. 6 is a block diagram of a FC sensor system.

FIG. 6 is a system block diagram of the FC Sensor. It employs a dual beam dual frequency transmitter 610, which is a dual beam $CO_2$ waveguide laser that is RF pumped. Good thermal stability attenuation of external acoustic disturbances is obtained by optimum use of invar in the construction of the device. One beam of the laser is stabilized on the peak of its gain curve and the other beam is coherently slaved to it with an 8 MHz offset.

The angular beam separation mentioned in section 3.0 is provided by the dual beam variable angular offset optics 612 following the dual beam transmitter (laser). Both beams, with small angular separation, pass through the T/R (Transmit/ Receive) duplexer 614 and lag angle compensator 616 to the Scanner/Pointer 620, comprising an elevation scanner 622, an azimuth scanner 624, an elevation pointer 626 and an azimuth pointer 628. The scanners and pointers operate in the same orthoqonal coordinate system, as already mentioned. The scanner mirrors are small, low inertia beryllium elements, whereas larger mirrors (brazed beryllium assemblies) are required for the pointers to accommodate an increased beam diameter provided by the beam expander between the scanner and pointer sections.

Following the Scanner/Pointer 620 there is an Afocal optics group 630 comprising the WFOV and NFOV optics 632, the Afocal Telescope 634, FOV segmentation wedges (prisms) 636 and an azimuth pointing mirror 638. The Afocal Telescope 634 relays the pupil at the azimuth pointing mirror 628 in the Scanner/Pointer 620 to a collimated ray bundle that is coaxial with the yaw gimbal of the pod head. This collimated ray bundle is the input to an afocal beam expander on the gimbals of the stabilized sight. The objective of the Afocal Telescope is one element of this beam expander. A separate four-element lens group can be inserted electrommechanically between the elements of the beam expander to increase the field of view by a factor of almost four.

Transmitted power scattered from object space retraces the optical path through optics 630, 620 and 616 to the T/R duplexer 614, from which it is reflected to the a quad detecting receiver 640. The signal corresponding to each beam is imaged on a separate detector pair. Compensation for lag angle is provided by driving the lag angle compensator 616 with an analog signal representing a flat earth prediction and correcting for any departure from the prediction by means of an error signal proportional to the position of the image on one detector pair.

Electronic output signals from the detector 640 are supplied to the detector electronic circuits 650. Upper and lower sidebands are electronically heterodyned to fixed IF amplifiers in the upper and lower sideband signal processors 652 and 654. The upper sideband from unit 652 is used in a target doppler MTI processor 656 to detect target doppler. The lower sideband from unit 654 is processed in a relative range processor 658 to provide one of the two inputs needed to develop the 8 MHz signal used by a digital phase detector to obtain the relative range, or $\Delta R$ output. The reference signal used by the phase detector is provided by the servo electronics for the dual beam transmitter.

Operation of the sensor is under control of a microprocessor programmed to sequence the sensor through the three modes described in section 3.0. A secondary microprocessor, under control of the primary microprocessor, performs the arithmetic intensive operations such as coarse range computation and mechanization of the target tracking filters. All of the scan waveforms for raster generation and timing plus the A/D and D/A converters are included with the control electronics assembly.

Figure 7:
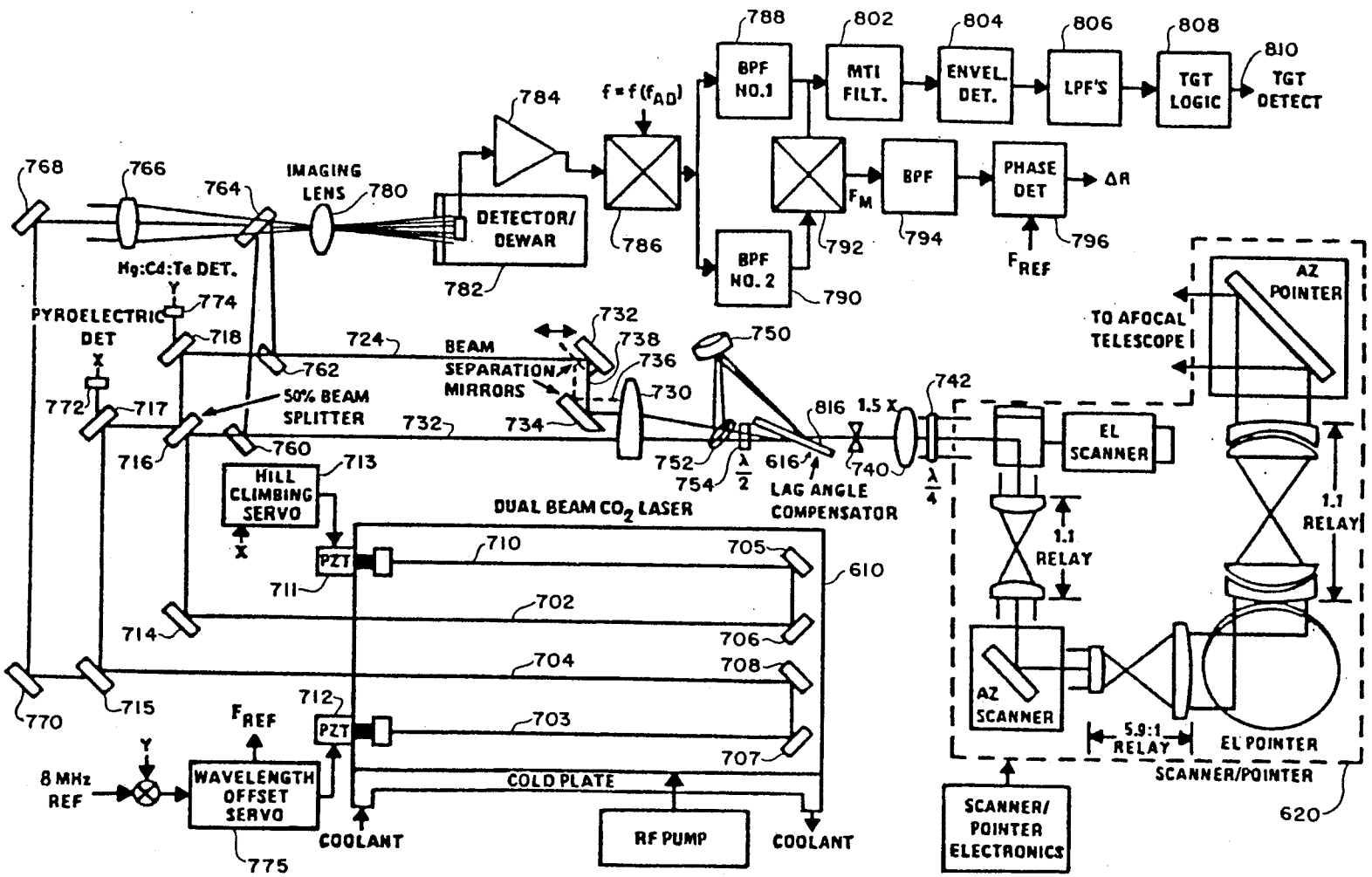
FIG. 7 is a functional block diagram of the FC sensor.

FIG. 7 is a functional block diagram of the FC Sensor, less the Afocal Telescope which has been omitted to keep the figure from becoming too "busy". The sources of power for this sensor is the dual beam laser 610. The cavity structure of the laser is a classical "sandwich" of five aluminum electrodes retained between two pieces of alumina to form four bores and to provide electrical isolation. The figure shows four beams 701–704 in the four bores. Two of the bores with beams 701 and 702 are optically coupled via mirrors 705 and 706 to form the cavity of one laser and the other two bores with beams 703 and 704 are coupled in the same manner via mirrors 707 and 708 to form the second laser cavity. All components of the lasers are installed in an invar housing. The length of each cavity is controlled by a PZT that displaces the totally reflecting mirror. One PZT 711 is in a closed loop servo 713 (hill climbing servo) that keeps the laser operating at the peak of its gain curve using the signal provided by the pyro electric detector 774 which samples the outdoing beam 732 using beam splitter 718. The PZT 712 for the other cavity is in a closed-loop servo 775 (wavelength offset servo) that keeps the second laser coherently offset by 8 MHz from the first laser using the signal provided by the pyro electric detector 772 which samples the outgoing beam 732 using beam splitter 717.

The unique essentially lossless modulation feature to produce amplitude modulation of the transmitted beams is accomplished by means of the 50 percent beamsplitter 716 that is common to both beams 702 and 704 of the laser, beam 702 being directed via a mirror 714 and the other beam 704 being directed via mirrors 715 and 717 to opposite sides of the beam splitter 716. As a result, both beams 722 and 724 out of the beam splitter are composed of one-half of the output of each laser and by careful optical alignment they will have a common optical axis. Since the components are separated in frequency by 8 MHz they will be in phase, then out of phase twice per cycle at 8 MHz: thereby producing amplitude modulation at 8 MHz.

One of the beams 732 from the 50 percent beam splitter 716 is not deviated by the lens 730 following the beam separation mirrors 732 and 734. However, it can be seen that linear translation of one beam separation mirror causes the other beam 724 to be deviated proportionally to how far off-axis it enters the lens 730. Thus, maximum angular separation of the beams, for ATA and ATR, is produced when the off-axis beam follows the path shown by dashed lines 736. Contiguous angular separation for ECP and ATT is shown by the solid lines 738.

Following the beam separation mirrors 734, the next critical element encountered by the two beams is a half wave plate 754 which rotates the polarization (linear) so that they are transmitted by the lag angle compensator 616. The optical element of the lag angle compensator is an enhanced coated ZnSe plate inclined at the Brewster angle (1.18 rad or 67.4°). (The enhanced coating signficantly increases reflectivity to the orthogonal polarization.) This element is the duplexer, referred to earlier, which differentiates between the transmitted and received power.

A 1.5× beam expander 740, after the lag angle compensator, increases the diameter of the beams by 50 percent before they are transmitted by a quarter wave plate 742. The quarter wave plate 742 changes the linear polarization to circular polarization. The functions performed as the beams are transmitted through the Scanner/Pointer 620 (and Afocal Telescope) already have been described.

Transmitted laser power reflected from object space, still nominally circularly polarized, retraces the optical path just described to the lag angle compensator 616. When the reflected power passes through the quarter wave plate 740, it becomes linearly polarized with the plane of polarization orthogonal to the polarization of the transmitted input to the quarter wave plate. Therefore, the received signals are reflected by the Brewster plate 816 in the lag angle compensator. The lag angle compensator 616 is rotated by a galvanometer about the long axis shown in FIG. 7 to compensate for the lag angle. The galvanometer is in a closed-loop servo commanded by a signal derived from a prediction of the lag angle for scanning a flat earth and corrected for deviations from this prediction as described earlier in this section. As a result, the signals reflected by the lag angle compensator 616 follow the essentially fixed path shown in FIG. 7 to the folding mirror 750 (shown above and to the left of the half wave plate 754).

The above folding mirror 750 reflects the signals to a second folding mirror 752, directly below the rays shown for the transmitted beams. This second folding mirror 752 is oriented so that in a plan view, the rays for the signals appear to be coincident with the rays representing the transmitted beams. A second beam separation lens (not shown), below the mirrors 732 and 734 shown in the figure, performs the inverse function described for the transmitted beams. The beam separation mirrors extend into the plane of the signals, thereby causing them to be reflected to the two small mirrors below the transmitted beams and at about 785 mrad (45°) to them. A 95 percent reflectivity beam combiner 764 then reflects the signals to the imaging lens 780. The beam combiner also transmits 5 percent of about 1 watt split off from one laser beam, which functions as the local oscillator. The local oscillator signal passes through lens 766 prior to combining with the signal beams below 724 and 732.

The optics for the local oscillator and signals are configured to provide the required wavefront matching conditions, as described in section 4.1.1. It was mentioned in section 3.0 that the FC Sensor operates in both the homodyne and heterodyne modes of coherent detection. Since one-half of the power in each signal originates in the same laser that provides the local oscillator, homodyne operation is implemented. However the other half of each signal originates in the laser that is offset 8 MHz from the laser that provides the local oscillator. Consequently, this combination produces heterodyne operation.

FIG. 7 includes a simplified functional block diagram of the signal conditioning electronics. The detector preamplifiers, (not shown), are installed in the detector/dewar assembly 782; thus, the external amplifier 784 shown connected to the detector/dewar is the post amplifier. These amplifiers have a bandwidth of 100 MHz to accommodate the doppler frequency offset due to the forward speed of the host aircraft. Remembering that the signal imaged on each detector originates from one-half of the output of each laser, one signal at the output of the detector will be the doppler offset due to aircraft motion (assuming the beam is not scanning a moving target. This signal is the difference frequency between the laser used for the local oscillator and its reflected counterpart. The second signal at the output of the detector is the doppler offset due to aircraft motion, plus 8 MHz; i.e., the second laser is offset 8 MHz above the reference laser.

A local oscillator signal, equal to 19 MHz$+(2V/\lambda)\times 10^{-6}$ (V-aircraft radial velocity along the beam axis: $\lambda$-wavelength of the laser) at the mixer following the postamplifier 784, heterodynes the detector output signals in unit 786 to a 19 MHz I.F. bandpass filter 790 (BPF No. 2) and an 11 MHz I.F. bandpass filter 788 (BPF No 1). The bandwidth of these intermediate frequency video channels is 7.5 MHz to accommodate radial target velocities up to $\pm 70$ Km/Hr. Frequency shifts due to target motion (i.e., MTI) are detected by means of 28 bandpass filters and associated electronics depicted by the row of functional blocks following BPF No. 1. Each of the bandpass filters 788 and 790, with a bandwidth of 500 kHz, is centered at a frequency that results in 250 kHz overlap of adjacent filters. In this way, target velocity can be resolved to slightly less than 5 Km/hr.

The two IF signals are mixed in unit 792 (i.e., heterodyned) as shown to obtain the 8 MHz difference frequency. After filtering in filter 794 to eliminate the unwanted products from the mixer, the 8 MHz signal provides one input to a digital phase detector 796. Because this 8 MHz signal is coherently related to the 8 MHz reference signal in the wavelength offset servo, as described above, the difference in phase between them is a measure of relative range. Either the signal from the 8 MHz crystal controlled reference oscillator in the wavelength offset servo or the detected frequency difference between the two lasers is available for use as the second (reference) input to the phase detector. That is, over an ambiguity interval of 18.75 meters, the output of the phase detector 796 is proportional to the location of an object being scanned within that interval.

The output of the bandpass filter 788 is also processed through an MTI filter 802, an envelope detector 804, a set of low-pass filters 806, and a target logic unit 808, to provide a target detect signal on line 810.

Only the set of video electronics for one beam, is shown in FIG. 7. A second set, which duplicates those shown, is provided for the signal received for the second beam.

There are two more 11 MHz IF channels not shown in FIG. 7. One detector element 772, for the off-axis beam, provides the input to one of these channels and the other element 774 provides the input to the other channel. (The output from both elements for each beam are summed to obtain the input to the IF channels already described.) Both channels, essentially identical, produce a detected signal whose amplitude is proportional to the signal power on the detector for that channel. The difference in amplitude between these output signals is divided by their sum to provide an error signal, independent of received signal power, proportional to the location of the signal on the two detector elements. When the signal is not centered on the pair of detectors, it signifies that the lag angle compensation is deficient. The resulting error signal is applied to the servo for the lag angle compensator, with the polarity needed to center the image on the detector pair.

It was mentioned earlier that the sensor is operated under the control of a microprocessor and that a second microprocessor is provided to perform the arithmetic intensive operations. These devices operate asynchronously with communication between them under the control of a bus arbitrator. The bus arbitrator, with 4K bytes of dedicated RAM, is configured to operate like a dual port RAM but without the cost and complication of that hardware. A novel approach to program storage, for both microprocessors, has been incorporated. That is, the program is stored in EPROMs and downloaded to RAM as part of the start-up sequence, instead of using forms of external program storage. (EPROMs are too slow for program execution.) Another unique feature of the digital electronics design, closely associated with the microprocessors, is digital generation of the waveforms for the raster(s) required by each mode of operation. The waveforms, stored in EPROMs, are clocked out of memory and converted to analog signals at a rate that exceeds the bandwidth of the servo it drives, thereby producing precision controlled (amplitude and frequency) waveforms.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A dual-beam amplitude-modulated laser transmitter/receiver suitable for laser-radar applications that is scalable to high powers, comprising:

a laser source with two separate independent laser optical cavities, each operating at its own frequency, a combining beam splitter at which signals from the two cavities are superimposed to form two transmitter output beams with each combined beam intensity modulated at the laser difference frequency, so that the output consists of two beams separated in elevation and with equal beam powers from each laser cavity with intensity modulation of 100%, Optical means following the combining beam splitter for processing and transmitting the two beams, reflected energy from the two beams being received at the optical means and directed to receiving means, in which each beam has its own homodyne detector and separate local oscillator, whereby means associated with each beam path forms a distinct homodyne transceiver.

2. A dual-beam amplitude-modulated laser transmitter/receiver according to claim 1, having means for the frequency of one of the laser sources to be changed in time, so that a modulated output suitable for absolute range measurements and fine doppler is generated.

3. A dual-beam amplitude-modulated laser transmitter/receiver according to claim 1, having means for laser injection locking in conjunction with means for laser frequency tracking to provide laser tracking stability.

4. A dual-beam amplitude-modulated laser transmitter/receiver according to claim 1, in which said optical means includes azimuth scanning means, elevation scanning means, azimuth pointer means, and an afocal telescope.

5. A dual-beam amplitude-modulated laser transmitter/receiver according to claim 4, in which said optical means further includes channel combining prism means including a $\lambda/4$ plate for each beam.

6. A dual-beam amplitude-modulated laser transmitter/receiver according to claim 4, in which said optical means further includes dynamic beam combining means including dynamic galvonometer control means.

* * * * *